United States Patent [19]

Clapp et al.

[11] Patent Number: 5,156,876
[45] Date of Patent: Oct. 20, 1992

[54] PARTING COMPOSITION FOR COOKING FOODSTUFFS

[75] Inventors: Clarence P. Clapp, Danville, Ill.; S. Jack Campbell, Plantation, Fla.

[73] Assignee: Creative Products Inc. of Rossville, Rossville, Ill.

[21] Appl. No.: 593,293

[22] Filed: Oct. 3, 1990

Related U.S. Application Data

[63] Continuation of Ser. No. 419,897, Oct. 11, 1989, abandoned.

[51] Int. Cl.$^5$ .............................................. A23D 9/00
[52] U.S. Cl. ................................... 426/609; 426/601; 426/811
[58] Field of Search ................. 426/601, 607, 609, 811

[56] References Cited

U.S. PATENT DOCUMENTS

| | | |
|---|---|---|
| T940,010 | 11/1975 | Simcox . |
| 2,309,488 | 3/1940 | Wasserman . |
| 2,463,870 | 3/1949 | Hansen . |
| 2,793,123 | 5/1957 | Haas ..................... 426/609 |
| 2,963,372 | 12/1960 | Brody et al. . |
| 3,189,466 | 6/1965 | McGrory . |
| 3,821,007 | 6/1974 | Carey . |
| 3,896,975 | 7/1975 | Follmer . |
| 4,104,403 | 8/1978 | Barker et al. . |
| 4,211,802 | 7/1980 | Carey ..................... 426/609 |
| 4,339,465 | 7/1982 | Strouss ................... 426/609 |
| 4,459,285 | 7/1984 | Gollier et al. ............ 424/74 |
| 4,654,220 | 3/1987 | Heine et al. ............. 426/609 |
| 4,654,221 | 3/1987 | Purves et al. . |

FOREIGN PATENT DOCUMENTS

| | | |
|---|---|---|
| 742244 | 11/1988 | Belgium . |
| 287281 | 10/1988 | European Pat. Off. . |
| 49-6165 | 2/1974 | Japan . |
| 61-16359 | 1/1985 | Japan . |
| 733602 | 5/1980 | U.S.S.R. . |

OTHER PUBLICATIONS

Witco Chemical Corp., "Surfactants for the Food Industry", Bulletin, 251, Jul. 1983.
Witco Chemical Corp., "EMPHOS Organic Phosphate Esters", Bulletin, 234, Nov. 1977.
Merck & Co., Inc., "Merck Index" entry 1667 for Calcium Glycero phosphate, p. 212.
Witco Chemical Company, Technical Bulletin 26B, Mar. 1978.

*Primary Examiner*—Joseph Golian
*Assistant Examiner*—Evan Federman
*Attorney, Agent, or Firm*—Victor E. Libert; Frederick A. Spaeth

[57] ABSTRACT

A parting composition for cooking foodstuffs includes a release agent which is a phosphate salt derivative of mono- and di-glycerides of edible fats, oils and/or fat-forming fatty acids, together with an edible oil and a pulverulent blocking agent. The edible oil may be any suitable vegetable or animal oil or shortening, and the blocking agent may be any edible clay, magnesium aluminum silicate, sodium bicarbonate, baking powder, ground limestone, calcium carbonate, calcium or magnesium stearate, flours or edible starches. For example, the blocking agent may comprise cereal flour or cornstarch, or a pharmaceutical kaolin, a food grade benetonite, calcium carbonate, or a mixture of two or more thereof. Preferably, the release agent is a mono-sodium glyceryl oleate phosphate. The composition may also include one or more of water, a suitable suspending agent such as fumed silica, and ethanol; a pressurized hydrocarbon propellant may be added when packaging the composition in a pressurized aerosol container. The parting composition of the invention shows resistance to darkening and maintaining of superior anti-stick, i.e., parting, characteristics even at high cooking temperatures, up to 450° F. or 500° F. (232.2° C. or 260° C.).

21 Claims, No Drawings

PARTING COMPOSITION FOR COOKING FOODSTUFFS

This is a continuation of copending application Ser. No. 07/419,897 filed on Oct. 11, 1989, now abandoned.

BACKGROUND OF THE INVENTION

1. Field Of The Invention

The present invention relates to a parting composition for use in cooking foodstuffs, more especially to a parting composition of the type applied to cooking utensils, such as baking and frying pans and the like, in order to prevent or reduce the sticking of food to the utensil during cooking.

2. Related Art

U.S. Pat. No. 4,654,221 to E. R. Purves et al discloses the addition to cooking fats of alkali and alkaline earth metal salts of an oxyacid of phosphorus, e.g., sodium, potassium and calcium phosphate salts, to provide an anti-sticking composition. The known use of lecithin (a phospholipid) as an anti-sticking additive for cooking fats is described, as is the tendency of increased lecithin content to cause darkening and the development of off-flavors during cooking. Additives for inhibiting such darkening, including carbonate or bi-carbonate salts, are described.

The use of flour in parting compositions containing edible oils and lecithin is known. U.S. Pat. No. 4,211,802 to W. C. Carey discloses a parting composition comprising clear flour (a wheat flour obtained from the first milling of the wheat), soybean flour, hydrogenated vegetable shortening, vegetable oil and lecithin. U.S. Pat. No. 3,821,007 to W. C. Carey discloses a method of preparing a spray-type pan material comprising vegetable shortening, commercial grades of wheat and soybean flour, a liquid vegetable salad oil, and lecithin.

U.S. Pat. No. 4,339,465 to O. L. Strouss discloses a baking pan release agent comprising a liquid emulsifier containing mono-glycerides and di-glycerides derived from animal fat or vegetable oils and a polysorbate compound, together with a major portion by weight of water. Unbleached liquid lecithin may be added to the composition to aid in its adherence to the walls of baking pans.

The use of sodium glyceryl oleate phosphate ("SGOP") as a pan release agent is disclosed in a technical bulletin of Witco Chemical Company (Bulletin 268, dated March, 1978), which discloses an ionic emulsifier surfactant, sold under the trademark EMPHOS D70-30C, comprised of phosphated mono- and di-glycerides derived from vegetable oils. The Technical Bulletin discloses that the functional properties of the surfactant are similar to those of lecithin and that, since the EMPHOS D70-30C product does not contain nitrogen derivatives, it is not subject to the degradation of taste and flavor sometimes associated with naturally occurring phospholipids.

SUMMARY OF THE INVENTION

Generally, the present invention provides a parting composition for cooking foodstuffs, the composition utilizing, in lieu of lecithin or other natural phospholipids, a phosphated derivative of glycerides of edible fatty materials ("Phosphated Derivative") in combination with a suitable blocking agent, preferably a refractory blocking agent. The present invention is predicated on the discoveries that (1) surprisingly good results are attained by the combination of the aforesaid Phosphated Derivative and a suitable blocking agent, and (2) that refractory blocking agents provide not only high temperature resistance to the parting composition, but superior results when used in combination with Phosphated Derivative.

Specifically, in accordance with the present invention, there is provided a parting composition for cooking foodstuffs comprising the following ingredients. A release agent comprising one or more phosphated derivatives of glycerides of edible fatty material, for example, phosphated derivates of mono- and di-glycerides of edible fatty materials; an edible oil; and a blocking agent comprising an edible pulverulent material, for example, a material selected from the group consisting of edible clays, such as food grade or pharmaceutical grade clays, e.g., bentonites or kaolins, magnesium aluminum silicate, sodium bicarbonate (baking soda), baking powder, ground limestone, calcium carbonate, magnesium or calcium stearate, flours and starches.

One aspect of the invention provides that the release agent is selected from the group consisting of salts, such as sodium, potassium, calcium and magnesium salts, of phosphate derivatives of edible fatty materials, for example, the release agent may be a monosodium phosphate derivative.

The parting composition may further include one or more of suitable additives of the type employed in parting compositions, especially in those which are combined with a propellant for dispensing from a pressurized aerosol container. Thus, the parting composition may also contain water, a dispersant such as pyrogenic silica and a foam-control ingredient such as ethanol.

Another aspect of the invention provides that the parting composition may comprise from about 2 to 8 parts by weight of the release agent, from about 77 to 97 parts by weight of the edible oil, and from about 1 to 12 parts by weight of the blocking agent.

Other aspects of the present invention are described in the following detailed description of the invention and preferred embodiments thereof.

As used herein and in the claims, the term "edible fatty materials" means and includes edible fats, edible oils and edible fat-forming fatty acids; the term is used broadly to generally encompass all edible oils and fats and fat-forming fatty acids, whether of vegetable or animal origin.

Reference herein, including the claims, to an ingredient of the parting composition being "edible" means that at least in the quantities used in the composition it may be ingested without ill effect; it does not necessarily mean that the edible material has nutrition value, although it may, as in the case of flour, some starches, and oils. Reference herein, including the claims, to "foodgrade" or "pharmaceutical" with respect to a clay or other material simply means a grade or quality of such material which is suitable and safe for ingestion, e.g., which may safely be used in or as a component of a food or medicine, and is otherwise suitable for such use by reason of its color, particle size, etc. As used herein including the claims: "baking soda" has its usual meaning of a synonym for sodium bicarbonate which may, but need not, contain a filler or minor amounts of other additives; "baking powder" has its usual meaning, i.e., a mixture of sodium bicarbonate, plus a weak acid or acidic compound and, usually, a filler. A typical baking powder composition is sodium bicarbonate, tartaric acid or monobasic calcium phosphate, and cornstarch. "Limestone" has its usual meaning of rock comprised mostly of calcium carbonate.

Reference herein, including the claims, to a blocking agent before "refractory" means edible materials which are significantly more resistant than flours and edible starches to charring or decomposition at high cooking temperatures; generally, the term embraces edible non-carbohydrate materials and includes clays, alkali metal and alkaline earth metal salts, such as carbonates and stearates, and mixtures thereof, e.g., ground limestone.

All percentages given herein, including those in the claims, are percentages by weight, based on the total weight of the formulation, unless explicitly stated otherwise.

DETAILED DESCRIPTION OF THE INVENTION INCLUDING PREFERRED EMBODIMENTS THEREOF

As indicated by some of the related art described above, a drawback of the use of lecithin or other phospholipids in parting compositions for cooking foodstuffs is their tendency to darken and provide off-colors and off-flavors at normal cooking temperatures. Some lecithin formulas begin to decompose at temperatures as low as 200° F. (93.3° C.) and blacken or darken when exposed to a temperature of about 350° F. (176.7° C.) for twenty minutes. The darkened decomposition products of lecithin are often transferred to the food being cooked, with adverse effects on appearance and flavor. The decomposition also destroys the anti-stick properties of the lecithin, resulting in sticking of the food to the cooking pan.

In contrast, the parting composition of the present invention has been found to exhibit excellent anti-stick characteristics and resistance to darkening and the development of off-flavors. These characteristics are maintained even at the high end of temperatures normally used for cooking, that is, at temperatures of about 400° F. to about 500° F. (204.4° to 260° C.), for significant time periods. Of course, if flour or starch is employed as the blocking agent in the composition, some discoloration will show after being heated to temperatures of about 400° F. (204.4° C.) for appreciable periods of time. However, when a refractory blocking agent such as an edible clay, sodium bicarbonate or calcium or magnesium stearate is used in the compositions of the present invention, the compositions show, in addition to excellent release characteristics, even greater resistance to discoloration at high cooking temperatures. To that extent, the use of refractory blocking agents is preferred.

The compositions of the present invention include, as described above in the Summary Of The Invention, a release agent which comprises one or more phosphated derivatives of glycerides of edible fatty materials, e.g., of mono- and di-glycerides of edible fatty materials. Generally, these compounds may be regarded as phospholipids which, unlike natural or processed lecithin, are free of nitrogen derivatives. For example, a preferred release agent utilizable in accordance with the present invention is sodium glyceryl oleate phosphate ("SGOP") which is identified by the Food and Drug Administration (Code of Federal Regulations, Title 21, Part 182.4521) as a monosodium phosphate derivative of mono- and di-glycerides of edible fats or oils, or edible fat-forming fatty acids. SGOP is a heat stable material and is listed by the Food and Drug Administration as generally recognized as safe ("GRAS"). SGOP is commercially available as described in the above-mentioned Technical Bulletin of Witco Chemical Company describing its EMPHOS TM D70-30C product. The CTFA Cosmetic Ingregient Dictionary (published by The Cosmetic, Toiletry and Fragrance Association, Inc., Washington, D.C.) identifies the EMPHOS TM D70-30C material as sodium glyceryl oleate phosphate, the sodium salt of a complex mixture of phosphate esters of glyceryl mono-oleate. Among the uses described for the EMPHOS TM surfactant in the afore-mentioned Technical Bulletin are as a mold release agent for chocolates and a pan release agent for fat-free frying. The Bulletin notes that the material functions over a wide temperature range. Although the EMPHOS TM material, an SGOP, may work well by itself as a pan release agent as claimed in the Witco Bulletin, the present inventors' attempts to substitute SGOP for lecithin in combination with a vegetable oil to provide an aerosol-dispensable parting composition were unsuccessful, because the anti-stick characteristics were lacking or insufficient. However, it was found that when a suitable blocking agent is added to a composition including SGOP and an edible oil, the result was not only the attainment of anti-sticking or parting characteristics which were superior to those of lecithin-based products, but a greatly improved resistance to high cooking temperatures for prolonged periods, without significant charring or the formation of off-colors or off-flavors. Especially good high-temperature resistance was attained, even for prolonged high-temperature cooking, when a refractory blocking agent, for example a food or pharmaceutical grade clay or magnesium or calcium stearate, or calcium carbonate (ground limestone) was utilized in the composition. However, flours and starches are also useful blocking agents.

For example, good results were obtained with compositions using SGOP and flour or starch blocking agents in oil bases; it is believed that excellent results would also be attained with other release agents comparable to SGOP. For example, useful release agents should be provided by appropriate alkali metal or alkaline earth metal phosphate derivatives, such as potassium, calcium and magnesium phosphate derivatives, of glycerides, e.g., mono- and di-glycerides, of edible fatty materials, e.g., of edible fats or oils, or edible fat-forming fatty acids.

Any appropriate edible oil or mixture of edible oils may be utilized in the parting composition of the invention. Vegetable oils, including partially hydrogenated vegetable oils, such as soybean oil, corn oil and canola oil have proved to be eminently satisfactory in use. Other oils or shortenings such as animal fats or edible fat-forming fatty acids derived from any suitable source are also useful in the practice of the present invention.

As noted above, it has been found that a blocking agent comprised of a suitable edible pulverulent solid material such as an edible clay, a bicarbonate or carbonate such as sodium bicarbonate or calcium carbonate, magnesium or calcium stearate, flour or starches, must be combined with the above-described release agent in order to impart the desired anti-stick or parting characteristics to the parting composition. The edible clay material may comprise, for example, one or more of a pharmaceutical grade kaolin, a food grade bentonite. Similarly, any suitable flour may be utilized, including ordinary commercial grades of wheat or other cereal flours or soybean flour, and any suitable starches such as cornstarch or the like, or mixtures of any of the foregoing. Without wishing to be bound by any theory of operation, it appears that the blocking agent acts to retain the other ingredients, the edible oil and the release agent, at the interface between the food being cooked and the utensil in which the food is cooked, by preventing, i.e., blocking, migration of the edible oil and the release agent into the foodstuff and away from the interface. In the absence of a blocking agent, the release agent of the invention, for example, SGOP, proved to be ineffective as a substitute for lecithin in parting compositions, because the resultant compositions showed poor release qualities.

Generally, the improved parting composition of the invention may have added to it ingredients and additives of the type known to be suitable to provide parting compositions tailored for specific uses, such as for being dispensed by conventional aerosol spray pressurized cans. For example, ethanol in small amounts may be added to the composition in order to control foaming, especially when the parting composition is packaged for application by means of a pressurized gas aerosol spray, for which purpose the composition may be combined with gaseous hydrocarbon propellants in a manner as known in the art. Water may also be added to the composition which may be made into an oil and water emulsion of the type used in pressurized aerosol-dispensed parting compositions. Any suitable suspending agent such as fumed silica may also be employed in the composition as a suspending agent for water and oil emulsions.

The parting compositions of the invention, as will be demonstrated by some of the Examples set forth below, show good high-temperature resistance, especially when a refractory blocking agent is used. That is, the compositions of the present invention show no, or very little, blackening or development of off-colors or off-flavors, and the retention of superior anti-stick properties even when used for cooking at high temperatures up to about 500° F. (260° C.). The parting compositions of the present invention are utilizeable in both frying and baking for a variety of foodstuffs.

Generally, the efficacy of the present invention is demonstrated by the following Examples which disclose, among other things, specific preferred embodiments of the invention.

Example 1 lists a number of parting compositions providing a series of embodiments of the present invention, which embodiments are adapted for dispersal by an aerosol spray using hydrocarbon dispersants. A number of comparative formulations are listed in Example 3, which illustrates a number of parting compositions (including some commercially available products) which lie outside the scope of the present invention either because they use lecithin instead of the release agent of the present invention (a "Phosphated Derivative" as described above in the Summary Of The Invention), or because they lack a blocking agent.

EXAMPLE 1

Parts A, B, C and D of Example 1 give formulations comprising embodiments of the present invention.

A. All Formulas in this Part A contained, in addition to the below-listed ingredients, 20 percent by weight of hydrocarbon propellant IP-46 and 1.8 percent by weight of Cab-O-Sil pyrogenic silica as a dispersent. IP-46 propellant is a standard propellant gas used in consumer aerosol spray packages. It is a mixture of isobutane and propane in a proportion to provide a vapor pressure of 46 psig at 70° F. The Release Agent is SGOP (that sold under the trademark EMPHOS D70-30C BY Witco Chemical Co.,). The Edible Oil is a partially hydrogenated canola oil, referred to below as "PHC".

| | Ingredients - Percent by Weight of Formula | | |
|---|---|---|---|
| Formula | Edible Oil PHC | Release Agent | Flour |
| M140D | 74.2 | 2.5 | 1.5 |
| M140E | 67.7 | 2.5 | 8.0 |
| M140F | 71.7 | 4.0 | 2.5 |
| M140G | 68.7 | 6.0 | 3.5 |
| M140H | 60.2 | 6.0 | 12.0 |
| M140I | 54.2 | 8.0 | 16.0 |
| M140J | 66.2 | 4.0 | 8.0 |
| M139A | 70.7 | 2.5 | 5.0 |
| M139B | 65.2 | 8.0 | 5.0 |

B. All Formulas in this Part B contained, in addition to the below-listed ingredients, 4.0 percent by weight SGOP as the Release Agent and 1.8 percent by weight Cab-O-Sil pyrogenic silica as a dispersant, except as otherwise noted for Formula D11A. The Propellant for all Formulas in Part B was IP-46. Edible oil SO is soybean oil, PHC is partially hydrogenated canola oil, CO is corn oil, CA is canola oil; Blocking Agent FL is flour, CS is cornstarch and BS is baking soda (sodium bicarbonate). The Release Agent is SGOP in all cases.

| | Ingredients - Percent By Weight of Formula | | | |
|---|---|---|---|---|
| Formula | Propellant | Edible Oil | Blocking Agent | Water |
| D7A | 18.0 | 15.0 SO | 4.0 FL | 57.0 |
| D7C | 18.0 | 15.0 SO | 4.0 FL | 59.0 |
| D8A | 30.0 | 61.2 SO | 3.0 CS | — |
| D8B | 30.0 | 61.2 SO | 3.0 BS | — |
| D9A[a] | 30.0 | 53.2 SO | 3.0 FL | — |
| D2A | 30.0 | 61.2 CA | 3.0 FL | — |
| D11A[b] | 30.0 | 61.2 MO | 3.0 FL | — |
| D11B[c] | 30.0 | 57.6 MO | 3.0 FL | — |
| D12A | 18.0 | 30.0 SO | 4.0 FL | 44.0 |
| D12C | 18.0 | 30.0 SO | 4.0 FL | 44.0 |
| D13A | 18.0 | 30.0 SO | 4.0 BS | 42.2 |
| D13B | 18.0 | 30.0 SO | 4.0 CS | 42.2 |
| D14A | 30.0 | 63.2 SO | 1.0 CS | — |
| D14B | 30.0 | 58.2 SO | 6.0 CS | — |
| D3A | 30.0 | 61.2 CO | 3.0 FL | — |
| D4A | 30.0 | 61.2 SO | 3.0 FL | — |
| D5A | 30.0 | 61.2 CA | 3.0 FL | — |

[a]Formula D9A contains, in addition to the listed ingredients, 8.0 weight percent of 200 proof ethanol.
[b]Formula D11A contains 1.8 weight percent Aerosil pyrogenic silica as the suspending agent, in place of Cab-O-Sil.
[c]Formula D11B contains 1.8 weight percent Sylox pyrogenic silica as the suspending agent, in place of Cab-O-Sil.

C. All Formulas in this Part C contained PHC as the edible oil; 30.0 weight percent IP-46 as the propellant in addition to the other ingredients listed; 1.8 weight percent Cab-O-Sil as the suspending agent, SGOP as the Release Agent, and Flour as the Blocking Agent.

| | Ingredients - Percent by Weight of Formula | | |
|---|---|---|---|
| Formula | PHC Edible Oil | SGOP Release Agent | Flour Blocking Agent |
| 152A | 63.70 | 2.50 | 2.00 |
| 152B | 62.70 | 2.50 | 3.00 |
| 152C | 61.70 | 2.50 | 4.00 |
| 153A | 64.20 | 1.00 | 3.00 |

-continued

| Ingredients - Percent by Weight of Formula | | | |
|---|---|---|---|
| Formula | PHC Edible Oil | SGOP Release Agent | Flour Blocking Agent |
| 153B | 63.45 | 1.75 | 3.00 |

D. All Formulas in this Part D contained 20.0 weight percent IP-46 as the propellant; 69.2 weight percent PHC as the Edible Oil; 5.0 weight percent Flour as the Blocking Agent and 1.8 weight percent Cab-O-Sil as the suspending agent, i.e., dispersant. The Release Agent is a combination of SGOP and a lecithin.

| Ingredients - Percent by Weight of Formula | | | |
|---|---|---|---|
| Formula | SGOP | Lecithin HR2B | Lecithin Cent. A |
| M146A | 0.5 | 3.5 | — |
| M146B | 2.0 | 2.0 | — |
| M146C | 3.5 | 0.5 | — |
| M145A | 0.5 | — | 3.5 |
| M145B | 2.0 | — | 2.0 |
| M145C | 3.5 | — | 0.5 |

When exposed to higher cooking and baking temperatures, for example, to temperatures of from 400° to 500° F., compositions in accordance with the present invention maintain their superior anti-stick characteristics and showed no evidence of darkening even when heated to 450° F. for 20 minutes, a test which successful commercial products failed.

Example 2 shows six parting compositions prepared in accordance with the present invention which include refractory blocking agents. Refractory blocking agents include edible clays, such as purified white bentonite, a water-purified colloidal montmorillonite clay sold under the mark Polar Gel by American Colloid Company, pharmaceutical grades of kaolin, such as colloidal kaolin USP sold by Whittaker, Clark and Daniels, Inc. of South Plainfield, N.J., calcium carbonate (ground limestone) also available from Whittaker, Clark and Daniels, Inc., sodium bicarbonate, magnesium aluminum silicate, and the like. Compositions using such refractory blocking agents show less charring and darkening when exposed to high temperatures than do otherwise comparable blocking compositions using non-refractory blocking agents, e.g., carbohydrate blocking agents such as four and starch.

EXAMPLE 2

The Formulas of Example 2 comprise embodiments of the invention using refractory blocking agents. Each of the formulas of Example 2 are comprised of 4.0 weight percent SGOP as the release agent, 66.0 weight percent soybean oil as the edible oil, and contain 2.0 weight percent Cab-O-Sil M-5 fumed silica as a dispersant and, together with the refractory blocking agent were formulated in an aerosol container with 25.0 percent by weight of IP-46 hydrocarbon gas propellant. Each of the formulations contained 3.0 weight percent of a refractory blocking agent, as follows:

| Formula | Blocking Agent |
|---|---|
| D-66A | Polar Gel purified white bentonite (American Colloid Company) |
| D-66C | Colloidal kaolin 2457 (Whittaker, Clark & Daniels, Inc.) |
| D-66D | Ground limestone, Clavcal 9133 (Whittaker, Clark & Daniels, Inc.) |
| D-66E | Ground limestone, 2933 (Whittaker, Clark & Daniels, Inc.) |
| D-79C | Magnesium stearate |
| D-79D | Calcium stearate |

Example 3 - Comparative Formulations

Parts A, B and C of Example 3 give comparative formulations which lie outside the scope of the present invention, either because they employ lecithin in lieu of the Phosphated Derivative (as defined in the above Summary of the Invention) or because they do not employ a blocking agent.

A. All Formulas in this Part A contained 20.0 weight percent of IP-46 as the Propellant, and PHC (partially hydrogenated canola oil) as the Edible Oil. Where a Blocking Agent is present, it is flour. As to the release agents, the Phospated Derivative is SGOP, the above-described Emphos D70-30C sodium glyceryl oleate phospate; "Cent. C" is Centrophase C, a lecithin product sold by Central Soya, Chemurgy Division, Fort Wayne, Ind.; it is stated by the supplier to contain 52% phospholipids and 47.3% other lipids. Release Agent "3FSB" is available from the same supplier, Central Soya, and is described as a natural fluid soybean lecithin. Release Agent "Cent. O" is "Centrophil", also available from the same supplier, and described as an oil-free soybean lecithin in selected vegetable oils (coconut and cottonseed oils) and including anti-oxidants. "Cent. A" is Centrolene A, a hydroxylated lecithin sold by Central Soya, a water-dispersible fluid lecithin which has been modified by hydroxylation. Release Agent "HR2B" is Centrophase HR-2B, also sold by Central Soya, described as a food grade, medium viscosity, highly filtered, refined fluid lecithin. None of these compositions contains both SGOP and a blocking agent; some contain neither.

| Ingredients - Percent By Weight of Formula | | | | | |
|---|---|---|---|---|---|
| | PHC | Release Agent | | | Flour Blocking |
| Formula | Edible Oil | SGOP | HR2B | Cent. A | Agent |
| M147A[a] | 69.2 | — | 2.0 | 2.0 | 5.0 |
| M147B | 76.0 | — | 2.0 | 2.0 | — |
| M147C | 76.0 | — | 4.0 | — | — |
| M147D | 76.0 | — | — | 4.0 | — |
| M140A[a] | 80.0 | — | — | — | — |
| M140B[a] | 73.2 | — | — | — | 5.0 |
| M140C[a] | 71.2 | 4.0 | — | — | — |
| M138D | 72.0 | 8.0 | — | — | — |

[a]These formulas contain, in addition to the listed ingredients, 1.8 weight percent Cab-O-Sil as a Suspending Agent.

B. All Formulas in this Part B contained IP-46 as the Propellant; Edible Oil SO is soybean oil, Edible Oil PHC is partially hydrogenated canola oil; the Release Agent is SGOP in all cases, in the amount of 4.0 weight percent of the Formula. Where present, the Suspending Agent is Cab-O-Sil M-5. No blocking agent was used in these compositions.

| Ingredients - Percent By Weight of Formula | | | | |
|---|---|---|---|---|
| Formula | Propellant | Edible Oil | Suspending Agent | Xanthan Gum |
| D10B | 30.0 | 61.2 PHC | 1.8 | 3.0 |
| D12B | 18.0 | 30.0 SO | — | — |
| D12D | 18.0 | 30.0 SO | — | — |
| D12E | 18.0 | 30.0 SO | — | 4.0 |
| D13C | 18.0 | 30.0 SO | 1.8 | — |
| D13D | 18.0 | 30.0 SO | 1.8 | 4.0 |
| D16A | 30.0 | 64.2 PHC | 1.8 | — |
| D16B | 30.0 | 64.2 PHC | 4.8 | — |

C. All Formulas in this Part C contained IP-46 as the Propellant in the amount of 20.0 percent by weight of the Formula except as otherwise noted with respect to Formula 154A; Edible Oil SO is soybean oil, PHC is partially hydrogenated canola oil, CO is corn oil; and CA is canola oil (rapeseed oil). None contains a blocking agent.

| Ingredients - Percent By Weight of Formula | | | | | |
|---|---|---|---|---|---|
| | | Release Agent | | | |
| Formula | Edible Oil | SGOP | Cent. C | 3FSB | Cent. O |
| 142A | 76.0 PHC | 0.5 | — | 3.5 | — |
| 142B | 76.0 PHC | 2.0 | — | 2.0 | — |
| 142C | 76.0 PHC | 3.5 | — | 0.5 | — |
| 143A | 76.0 PHC | 0.5 | — | 3.5 | — |
| 143B | 76.0 PHC | 2.0 | — | 2.0 | — |
| XC[b] | 77.5 SO | — | 1.0 | — | — |
| XB[b] | 75.0 CO | — | — | — | — |
| M150A[b] | 77.5 PHC | 2.5 | — | — | — |
| M150B | 77.5 PHC | 2.5 | — | — | — |
| M137E[c] | 77.5 PHC | — | — | 2.5 | — |

Each of the formulations of Examples 1 and 2, comprising specific embodiments of the present invention, and each of the formulations of Example 3, comprising comparative formulations, were tested and the results obtained are set forth in the following Example 4. The comparative compositions identified as "Brands" are popular brands of aerosol-dispensed food-release sprays readily available in supermarkets and grocery stores.

EXAMPLE 4

Each of the compositions of Examples 1, 2 and 3 were tested in a cake release test, as follows. Two cupcake pans were used in the test; one was an aluminum muffin pan having twelve individual cupcake cavities measuring two inches in diameter at the top, one and one quarter inches in diameter at the bottom and three quarters of an inch deep. The second pan was a steel pan having twelve cavities measuring two nd seven eights inches in diameter at the top, two inches in diameter at the bottom, and one and three sixteenths inches deep.

Jiffy Brand White Cake Mix was used in the test. This is a high sugar cake mix and the cake batter was prepared in accordance with the package directions by adding whole eggs and water to the mix and stirring to make the batter. After making the batter, a group of three cupcake cavities were sprayed with one test formulation product while the nine other cavities were covered with a cardboard sheet; then another test formulation was applied in the next three adjacent cavities, and so on. This procedure was continued until all of the cavities were sprayed or otherwise coated with a test formulation, giving four products tested in three different cavities of each pan.

Approximately the same amount of the Jiffy White Brand Cake batter was then spooned into each cavity and the filled pans were then put into a pre-heated gas-fired oven and baked at 350° F. for twenty minutes. The pans were then removed and allowed to cool at ambient room temperature for five minutes. The pan was inverted to an upside-down position to see if any of the cupcakes fell out, and the results noted. While inverted, the pan was shaken once to see if additional cupcakes fell out and the results were noted. The shakes were repeated one at a time until the upside-down pan was subjected to ten shakes and the number of cakes that fell out in each shake was recorded. At the end of ten shakes it was noted how many cupcakes, if any, were not removed by the ten shakes procedure.

Table I of this Example 4 tabulates the results attained by testing the compositions of Example 1, which comprise different embodiments of the present invention. Table II of this Example 4 tabulates the results attained by testing the comparative compositions of Example 2, each of which lie outside the scope of the present invention. The results attained are quantified by assessing "points" according to the total number of shakes required for de-panning of the cupcakes, as follows. For each cupcake which fell out of its cavity upon the pan being tipped over, without necessity of shaking the pan, zero points is charged; if one or more shakes of the upside-down pan are required to de-pan the cupcake, one point is assessed for each shake required; if the cupcake was not de-panned after 10 shakes, 15 points are assessed against that cavity. In the tabulation of Tables I and II the "Individual Scores, Points" shows the points assessed to each cavity tested with a particular spray and the "Average Score" is attained by dividing the sum of individual points by the number of cavities tested with a given spray formulation. With this system, a perfect score with respect to release of the cupcakes is zero, and the worst possible score is an average of 15 points, which means that none of the cupcakes was de-panned with ten shakes of the upside-down pan. Most formulations were tested in three cavities, some in six and a few in nine; the number of cavities in which a given formulation was tested is indicated by the number of individual scores reported for that formulation.

TABLE I

| Results of Release Tests of Compositions of Example 1 | | |
|---|---|---|
| Formula | Individual Scores, Points | Average Score, Points Per Cavity |
| M146A | 2, 3, 15 | 6.67 |
| M146B | 0, 0, 0; 0, 0, 1 | 0.17 |
| M146C | 0, 0, 0; 1, 1, 1 | 0.50 |
| M250D | 2, 3, 4 | 3.00 |
| M140E | 0, 0, 1 | 0.33 |
| M140F | 0, 1, 1 | 0.67 |
| M140H | 1, 1, 1 | 1.00 |
| M140H | 0, 1, 1 | 0.67 |
| M140I | 0, 0, 1 | 0.33 |
| M140J | 0, 0, 0 | 0 |
| M139A | 0, 0, 1; 0, 1, 1; 1, 1, 1 | 0.67 |
| M139B | 0, 0, 1 | 0.33 |
| D7C | 3, 3, 3 | 3.00 |
| D8A | 0, 0, 1 | 0.33 |
| M145B | 1, 1, 3 | 1.67 |
| D3A | 0, 0, 0; 0, 0, 1 | 0.17 |
| D4A | 0, 0, 0; 0, 0, 1 | 0.17 |
| D5A | 0, 0, 0; 0, 0, 0 | 0 |
| M152A | 0, 1, 2 | 1.00 |
| M152B | 0, 1, 1 | 0.67 |
| M152C | 1, 1, 1 | 1.00 |
| M153A | 1, 1, 1 | 1.00 |

TABLE I-continued

| | | |
|---|---|---|
| M153B | 1, 1, 1 | 1.00 |
| M154B | 1, 2, 6 | 3.00 |
| M143C | 4, 6, 8 | 6.00 |
| D8B | 0, 1, 1 | 0.67 |
| D9A | 0, 1, 1 | 0.67 |
| D2A | 0, 1, 1; 0, 0, 0; 0, 1, 1 | 0.44 |
| D11A | 0, 0, 0; 0, 0, 0; 1, 2, 15 | 2.00 |
| D11B | 0, 0, 0; 0, 0, 1 | 0.17 |
| D13B | 1, 1, 3 | 1.33 |
| D14A | 1, 1, 1; 1, 5, 15 | 4.00 |

Results of Release Tests of Compositions of Example 2
(Refractory Release Agents)
Part B

| | | |
|---|---|---|
| D-66A | 1, 1, 1; 1, 1, 1 | 1.00 |
| D-66C | 1, 1, 1; 1, 1, 2 | 1.16 |
| D-66D | 1, 1, 1; 1, 2, 2 | 1.33 |
| D-66E | 0, 0, 1; 1, 1, 0; 1, 1, 0; 0, 0, 1 | 0.50 |
| D-79C | 0, 0, 0; 0, 0, 0; 0, 0, 0; 0, 0, 0 | 0.00 |
| D-79D | 0, 1, 0; 0, 0, 0 0, 0, 0; 0, 1, 0 | 0.17 |

Summary of Results of Table I

| | All | Compositions of Example 2 |
|---|---|---|
| Total Points: | 192 | 29 |
| Total Cavities: | 189 | 54 |
| Overall Average Points: | $\frac{192}{189} = 1.02$ | $\frac{29}{54} = 0.54$ |

TABLE II

Results of Release Tests of Comparative Compositions of Example 3

| Formulation | Individual Scores, Points | Average Score, Points Per Cavity |
|---|---|---|
| M150A | 7, 15, 15 | 12.33 |
| M150B | 2, 3, 3; 5, 6, 15 | 5.67 |
| M137E | 1, 1, 2; 3, 3, 6 | 2.67 |
| D16A | 1, 2, 3; 3, 3, 7 | 3.17 |
| D16B | 2, 3, 3; 8, 10, 15 | 6.83 |
| M154A | 1, 1, 2 | 1.33 |
| M142A | 15, 15, 15 | 15.00 |
| M142B | 15, 15, 15 | 15.00 |
| M142C | 15, 15, 15 | 15.00 |
| M143A | 15, 15, 15 | 15.00 |
| M143B | 1, 6, 15 | 7.33 |
| D10B | 1, 2, 2 | 1.67 |
| D12B | 0, 0, 15 | 5.00 |
| D12D | 9, 15, 15 | 13.00 |
| D12E | 1, 5, 15 | 7.00 |
| D13C | 1, 7, 15 | 7.67 |
| D13D | 3, 8, 15 | 8.67 |
| M147A | 15, 15, 15 | 15.00 |
| M147B | 8, 15, 15 | 12.67 |
| M147C | 7, 9, 15 | 10.33 |
| M147D | 15, 15, 15 | 15.00 |
| M140B | 4, 15, 15 | 11.33 |
| M140C | 15, 15, 15 | 15.00 |
| M138D | 15, 15, 15 | 15.00 |
| Brand K | 9, 15, 15 | 13.00 |
| Brand L | 9, 15, 15 | 13.00 |
| Brand H | 3, 6, 10 | 6.33 |
| Brand A | 15, 15, 15 | 15.00 |
| Brand D | 0, 0, 1; 1, 2, 3 | 2.33 |
| Flour | 15, 15, 15; 15, 15, 15 | 15.00 |
| Vegetable Oil | 15, 15, 15; 15, 15, 15 | 15.00 |
| Unlubricated, clean cavities | 15, 15, 15; 15, 15, 15 | 15.00 |

Summary of Results of Table II

| | All | (X) |
|---|---|---|
| Total Points: | 1779 | 1509 |
| Total Cavities: | 123 | 105 |
| Overall Average Points: | $\frac{1779}{123} = 14.46$ | $\frac{1509}{105} = 14.37$ |

(X) = Omitted from these figures are the results of the tests conducted with cavities coated with flour, with vegetable oil, and unlubricated cavities.

The results provided by the popular brand food-release sprays, Brands K, L, H, A and D, are summarized as follows:

| | |
|---|---|
| Total Points: | 149 |
| Total Cavities: | 18 |
| Overall Average Points: | $\frac{149}{18} = 8.28$ |

The above tabulated results show that the food-release compositions of Table I, each of which is an embodiment of the present invention, were on average dramatically more effective than those of Table II, each of which is a comparative composition not in accordance with the present invention. The composition of Table I show an average point value of 1.02 points whereas the compositions of Table II show, even after eliminating the worst results (attained using only a flour as a release composition, only vegetable oil as a release composition, and no release composition) an average of 14.37 points. Even the commercially available popular brands showed an average point score of 8.28, more than eight times greater than the average of 1.02 for compositions (Example 2) in accordance with the present invention. Compositions in accordance with the present invention using the refractory blocking agents (clay, limestone, calcium stearate or magnesium stearate) of the D-66 and D-79 series of formulas showed even better results than the other compositions of the invention, with an excellent average point score of only 0.54, less than one-fifteenth of the 8.28 average point score of popular brand, commercially available spray release compositions. The results clearly show that SGOP when used in combination with a vegetable oil but without a blocking agent (e.g., Formulas in Parts B and C of Example 3) does not provide a parting composition which exhibits satisfactory anti-stick or parting characteristics as compared to those provided by the composition of the present invention. The anti-stick characteristics become radially more effective only when a release agent in accordance with the present invention, e.g., SGOP, is combined with a suitable blocking agent in a composition containing the edible oil. Similarly, the utilization of flour in combination with oil, and lecithin but lacking SGOP (Formula M147A of Part A of Example 3) shows only fair to poor anti-stick characteristics. On the other hand, the combination of a release agent plus a blocking agent in accordance with the present invention, and an edible oil, exhibits superior anti-stick characteristics as compared to the prior art compositions.

EXAMPLE 5

Parting compositions made in accordance with the present invention were tested against commercially available, nationally known food-release compositions, the ingredients of which, as printed on their labels, are as follows.

Brand A contains two or more of the following vegetable oils: soybean, coconut, corn, safflower or sunflower; plus lecithin, beta-carotene, artificial butter flavors, and propellant.

Brand B contains two or more of the following vegetable oils: soybean, corn or cottonseed with mineral oil; plus lecithin, imitation butter flavor, and propellant.

Brand C contains partially hydrogenated and winterized soybean oil, coconut oil, lecithin, artificial butter flavor, beta-carotene, dimethylpolysiloxane (anti-foaming agent), with propellant.

Brand D contains soybean oil, propellant (isobutane), hydroxylated lecithin, lecithin, enriched flour, (niacin, iron, thiamine mononitrate, riboflavin), silicon dioxide, and tbhq (to insure freshness).

Brand E contains corn oil, lecithin, alcohol, methyl silicone (for better pan coverage), citric acid (to protect freshness), and propellant.

Brand F contains vegetable oil, lecithin, concentrated natural butter flavor, salt, beta-carotene and propellant.

Brand G contains corn oil, grain alcohol, natural lecithin, and propellant.

Brand H contains corn oil, lecithin, artificial butter flavor, dimethylpolysiloxane, beta-carotene and propellant.

Brand I contains a blend of two or more of the following vegetable oils: soybean, coconut, corn or safflower oil with lecithin, beta-carotene, imitation butter flavor and propellant.

Brand J contains a blend of two or more of the following vegetable oils: soybean, corn, cottonseed with mineral oil, lecithin, artificial flavor, and propellant.

The propellant in each of the above compositions is believed to be a hydrocarbon propellant similar or identical to those used in the Examples of compositions in accordance with the present invention.

A typical institutional pancake batter, Belgian Waffle Base by Superior Coffee and Foods Company, Bensenville, Ill., was used for this test. Two skillets were used in the test; one was heavy aluminum and the other was high quality stainless steel. Both skillets performed about the same. Before each test the pans were scoured with Brillo brand soaped steel wool pads to remove evidence of any coating, and then the pans were scoured a second time with Ajax brand scouring powder, rinsed and dried. Little if any difference in the release characteristics was noted between spraying the skillets while room temperature, or while hot. The skillets were sprayed lightly to just wet the total cooking surface with the product under test. Batter was poured in the center of the pan and the pancake was allowed to fry until the batter surface appeared bubbly. At this point the pan was tilted and shaken to see if the pancake would slide on the bottom of the pan. If it slid, then the pan was tossed to flip-turn the p...cake. This, obviously, indicated the desired release characteristics. When the pancake was done on the flip side, it was slide-transferred to a plate and additional batter was placed in the pan for another pancake. No additional spray was applied. This was continued until either a pancake stuck and could not be flip-turned, or severe black charring was noted on the pan cooking surface. If fifteen pancakes were consecutively flipped without additional spraying or evidence of sticking, the test was discontinued. The number of pancakes that could be fired before sticking commenced was noted, as well as the condition of the pan and the difficulty in cleaning the used pan. A surface thermometer indicated the pan surface temperature at over 450° F. but less than 500° F. during cooking. This temperature is considered appropriate for institutional or commercial cooking of pancakes, particularly when time is a factor.

Test #1: No Lubricant. Batter was added to a hot, clean, dry skillet with no spray applied. The pancake immediately stuck tight and was difficult to remove even with a metal spatula.

Test #2: Margarine Lubricant. Batter was added to a skillet containing a patty of butter flavored margarine. The first two pancakes were removed satisfactorily, but the third pancake stuck.

Test #3: Comparative Formulations.

Brand A food-release spray: The first two pancakes were satisfactorily removed, but the third pancake stuck to the skillet, which darkened and was difficult to clean.

Brand B food-release spray: Satisfactorily flip-turned fifteen pancakes, and the skillet stayed fairly clean and was not too difficult to clean back to bare metal.

Brand C food-release spray: The first pancake was satisfactorily removed, but the second pancake stuck to the skillet.

Brand D food-release spray: Dispensed foam that splattered when being applied to the skillet. When hot, the foam turned dark brown around edges of the pancake. The first three pancakes were satisfactorily removed, and the fourth pancake slightly stuck on the flip side. The fifth pancake did not stick tight, but could not be flip-turned and left some burnt spots on skillet.

Brand E food-release spray: Flip-turned nine pancakes satisfactorily, but the tenth pancake stuck. The skillet remained clean while frying.

Brand F food-release spray: Satisfactorily flip-turned twelve pancakes. The skillet appeared fairly clean, but was very difficult to clean back to bare metal after use.

Brand G food-release spray: Sprayed satisfactorily onto the skillet. The first pancake was a little brown around the edges, but release from the skillet was good. Flip turned fifteen pancakes. Noted black charred ring on cooking surface of the skillet, which was somewhat difficult to clean, although not as bad as some of the other products tested.

Brand H food-release spray: The first pancake stuck and the skillet was very hard to clean.

Brand I food-release spray: The first two pancakes were satisfactorily removed but the third pancake stuck to the skillet, which stayed fairly clean. The first pancake cooked very brown.

Brand J food-release spray: Satisfactorily flip-turned fifteen pancakes. The skillet appeared fairly clean but was very hard to clean back to bare metal.

Test #4: Formulation In Accordance With An Embodiment Of The Present Invention Employing A Non-Refractory Blocking Agent (Flour).

Formula D2A (Part B of Example 1). Sprayed satisfactorily with some foam on the surface of the skillet, but no splattering. Satisfactorily flip-turned fifteen pancakes. The skillet was not brown or discolored, and was easy to clean back to bare metal.

Some of the commercially available, well-known products performed quite well, while others left a great deal to be desired with respect to the anti-stick characteristics and ease of cleaning after use. Formula D2A in accordance with the present invention provided excellent anti-stick characteristics, easy clean-up, and lack of discoloration, performing as well as any, and better than most, of the commercially available sprays.

Test #5: Formulations in accordance with an embodiment of the present invention employing refractory blocking agents.

Formulas D-66A, D-66C, D-66D and D-66E (Example 2) were employed in both pancake frying tests as described above an in waffle-baking tests employing the Superior Belgian Waffle Base Mix to prepare waffles in a waffle-baking iron in accordance with the package direction, and in an egg-frying test. Generally, the formulations of the present invention utilizing the refractory blocking agents performed as well as, and, in some cases, significantly better than the commercially available spray-release compositions when used in identical tests for pancake frying, egg frying and waffle baking. For example, in the waffle baking test Formula D-66A, with a single application, enabled the cooking and easy removal of two waffles with the third waffle sticking only slightly. The same results were achieved with Formula D-66C and, with Formula D-66D, the first five waffles were removed entirely without sticking with a single application of the Formula. The sixth waffle stuck slightly. Formula D-66E provided good, non-sticking release through the seventh waffle with a single application of the Formula. Each of the four Formulas D-66A, C, D, and E performed well in the egg-frying test, the first egg fried being able to be flipped-turned without a spatula by flipping the frying pan, with a second egg being easily turned with use of a spatula. All four of the tested Formulas utilizing the refractory blocking agent cleaned up very easily, generally better than the commercially available cooking sprays, enabling cleaning of the cooking utensil back to the bare metal with a minimum of effort. The Formula D-66E provided notably easy clean-up.

Formulas D-79C and D-79D (Example 2) were also tested for use in egg-frying. In a clean, metal frying pan onto which Formula D-79C was sprayed, the first egg fried could be flipped-turned, i.e., flipped over, in the frying pan. A second egg fried without re-spraying the pan could not be flip-turned but was easily removed and turned by use of a spatula. The results were obtained in an egg-frying test using Formula D-79D.

Typical pressurized aerosol spray formulas in accordance with the present invention, which includes an aerosol propellant and provide performance characteristics better than most commercial aerosol food-release products, include the compositions A-O of the following Example 6.

EXAMPLE 6

| Ingredient | Formulation | | |
|---|---|---|---|
| | A | B | C |
| SGOP | 1.5% | 4.0% | 7.0% |
| Pillsbury XXXX Flour | 2.0% | 3.0% | 9.0% |
| Cab-o-Sil | 0.9% | 1.8% | 2.3% |
| Soybean Oil | 75.6% | 69.2% | 53.7% |
| Hydrocarbon Propellant | 20.0% | 22.0% | 28.0% |
| | 100.0% | 100.0% | 100.0% |

| | Formulation | | |
|---|---|---|---|
| | D | E | F |
| SGOP | 1.5% | 4.0% | 7.0% |
| Magnesium or Calcium Stearate | 2.0% | 3.0% | 9.0% |
| Cab-o-Sil | 0.9% | 1.8% | 2.3% |
| Soybean Oil | 75.6% | 69.2% | 53.7% |
| Hydrocarbon Propellant | 20.0% | 22.0% | 28.0% |
| | 100.0% | 100.0% | 100.0% |

| Ingredient | Formulation | | |
|---|---|---|---|
| | G | H | I |
| SGOP | 1.5% | 4.0% | 7.0% |
| Corn Starch | 2.0% | 3.0% | 9.0% |
| Cab-o-Sil | 0.9% | 1.8% | 2.3% |
| Soybean Oil | 75.6% | 69.2% | 53.7% |
| Hydrocarbon Propellant | 20.0% | 22.0% | 28.0% |
| | 100.0% | 100.0% | 100.0% |

| | Formulation | | |
|---|---|---|---|
| | J | K | L |
| SGOP | 1.5% | 4.0% | 7.0% |
| Pillsbury XXXX Flour | 3.0% | 3.0% | 3.0% |
| Cab-o-Sil | 0.9% | 1.8% | 2.3% |
| Soybean Oil | 18.0% | 30.0% | 42.0% |
| Hydrocarbon Propellant | 20.0% | 22.0% | 22.0% |
| Water | 56.6% | 39.2% | 23.7% |
| | 100.0% | 100.0% | 100.0% |

| | Formulation | | |
|---|---|---|---|
| | M | N | O |
| SGOP | 1.5% | 4.0% | 7.0% |
| Pillsbury XXXX Flour | 2.0% | 3.0% | 9.0% |
| Cab-o-Sil | 0.9% | 1.8% | 2.3% |
| Soybean Oil | 67.6% | 61.2% | 45.7% |
| Hydrocarbon Propellant | 20.0% | 22.0% | 28.0% |
| Ethanol | 8.0% | 8.0% | 8.0% |
| | 100.0% | 100.0% | 100.0% |

The aerosol Formulas of this Example 6 exhibit no foaming when sprayed according to directions for use, although some foaming may occur when excessive amounts are sprayed onto the surface of the cooking utensil. If foaming presents a problem, the addition of alcohol (ethanol) to the Formulas will radically reduce their foaming characteristics. Ethanol should be added in an amount of from about 2.0% to about 14.0%. The performance of the product will not be altered by addition of ethanol in these amounts.

The combination of SGOP and flour can be packaged for marketing as a liquid for application by cloth, brush, sponge of the like, as a pump spray, aerosol spray or for use in any dispensing mechanism that will provide a thin film of the Formula on the surface of the utensil, e.g., baking or frying pan. An oil based concentrate formula could be prepared as follows:

EXAMPLE 7

| SGOP | from about 2% to about 8% |
|---|---|
| Flour | from about 1% to about 12% |
| Suspending Agent | from about 0.8% to about 2.5% |
| Vegetable Oil | from about 77.5% to about 96.2% |

A formulation intended for use as an aerosol spray product would include the concentrate of Example 5 plus from about 12% to about 35% of a suitable propellant. The propellant would consist of one of, or an appropriate blend of, propane, isobutane or n-butene, to provide a pressure of about 20–50 psig at 70° F. Soluble, non-liquifiable propellants such as nitrous oxide or carbon dioxide could be used to pressurize the container to about 100 psig at 70° F.

Water-based emulsion formulations could be prepared as follows:

| SGOP | from about 2% to about 8% |
|---|---|
| Flour | from about 1% to about 12% |
| Vegetable Oil | from about 12% to about 50% |

| | |
|---|---|
| Water | from about 27.5% to about 60% |
| Suspending Agent | from about 0.8% to about 2.5% |

Preparation of the formulation of Example 7 as an aerosol spray product would call for the addition of a propellent as described above.

As indicated by the above formulation, the compositions of the invention may include other usual and desirable additives, in particular, the addition of a suspending agent such as a micronized or fumed amorphous silica or similar or comparable suspending agents is useful, especially when compositions in accordance with the present invention are formulated as emulsion products with water and oil.

While the invention has been described in detail with respect to specific preferred embodiments thereof, it will be understood that upon a reading of the foregoing description, variations to the specific embodiments disclosed may occur to those skilled in the art and it is intended to include such variations within the scope of the appended claims.

What is claimed is:

1. A parting composition for cooking foodstuffs comprises:
   (a) a release agent comprising one or more sodium or potassium phosphate salt derivatives of glycerides of edible fatty materials;
   (b) an edible oil; and
   (c) a blocking agent comprising an edible pulverulent material selected from the group consisting of one or more of edible clays, magnesium aluminum silicate, sodium bicarbonate, baking powder, ground limestone, calcium carbonate, magnesium stearate, flours and starches.

2. The parting composition of claim 1 wherein the release agent is a phosphate salt derivative of mono- and di-glycerides of edible fatty materials.

3. The parting composition of claim 1 wherein the release agent is a monosodium phosphate salt derivative.

4. The parting composition of claim 1, claim 2, or claim 3 wherein the blocking agent is a refractory blocking agent.

5. The parting composition of claim 1, claim 2, or claim 3 wherein the blocking agent is selected from the group consisting of one or more of food grade bentonite, pharmaceutical kaolin, sodium bicarbonate, ground limestone, calcium carbonate, and magnesium stearate.

6. The parting composition of claim 1, claim 2, or claim 3 further including one or more of water, ethanol and pyrogenic silica.

7. The parting composition of claim 6 further including a hydrocarbon propellant gas.

8. The parting composition of claim 1, claim 2, or claim 3 wherein the release agent comprises a hydrogenated phosphate salt derivative of mono- and di-glycerides of edible fatty materials.

9. The parting composition of claim 1, claim 2, or claim 3 comprising from about 2 to 8 parts by weight of the release agent, from about 77 to 97 parts by weight of the edible oil, and from about 1 to 12 parts by weight of the blocking agent.

10. The parting composition of claim 9 wherein the blocking agent is a refractory blocking agent.

11. A parting composition for cooking foodstuffs comprises:
    (a) a release agent comprising a phosphate salt derivative of mono- and di-glycerides of edible fatty materials selected from the group consisting of sodium, and potassium phosphate salt derivatives;
    (b) an edible oil; and
    (c) a blocking agent comprising a pulverulent material selected from the group consisting of one or more of edible clays, magnesium aluminum silicate, sodium bicarbonate, baking powder, ground limestone, calcium carbonate, magnesium stearate, flours and starches.

12. The parting composition of claim 11 wherein the release agent is a monosodium phosphate salt derivative.

13. The parting composition of claim 11 wherein the blocking agent is selected from the group consisting of one or more of edible clays, magnesium aluminum silicate, sodium bicarbonate, baking powder, ground limestone, calcium carbonate, and magnesium stearate.

14. The parting composition of claim 11, claim 12 or claim 13 further including a propellant gas.

15. A method of facilitating the removal of cooked foodstuffs from a cooking utensil having a cooking surface, the method comprising, prior to introducing into the utensil food to be cooked, applying to the cooking surface of the utensil a coating of a parting composition comprising (a) a release agent comprising one or more sodium or potassium phosphate salt derivatives of glycerides of edible fatty materials, (b) an edible oil, and (c) a blocking agent comprising an edible pulverulent material selected from the group consisting of one or more of edible clays, magnesium aluminum silicate, sodium bicarbonate, baking powder, ground limestone, calcium carbonate, magnesium stearate, flours and starches.

16. The method of claim 15 wherein the release agent is a phosphate salt derivative of mono- and di-glycerides of edible fatty materials.

17. The method of claim 15 wherein the blocking agent is selected from the group consisting of one or more of edible clays, magnesium aluminum silicate, sodium bicarbonate, baking powder, ground limestone, calcium carbonate, and magnesium stearate.

18. The method of claim 15 wherein the release agent is a monosodium phosphate salt derivative.

19. The parting composition of claim 5 wherein the blocking agent is selected from the group consisting of one or more of food grade bentonite, pharmaceutical kaolin, ground limestone, and magnesium stearate.

20. The parting composition of claim 13 wherein the blocking agent is selected from the group consisting of one or more of edible clays, magnesium aluminum silicate, baking powder, and magnesium stearate.

21. The method of claim 17 wherein the blocking agent is selected from the group consisting of one or more of edible clays, magnesium aluminum silicate, baking powder, ground limestone, and magnesium stearate.

* * * * *

UNITED STATES PATENT AND TRADEMARK OFFICE
CERTIFICATE OF CORRECTION

PATENT NO. : 5,156,876

DATED : October 20, 1992

INVENTOR(S) : Clarence P. Clapp et al

It is certified that error appears in the above-identified patent and that said Letters Patent is hereby corrected as shown below:

In the Abstract, line 12, replace "benetonite" with --bentonite--.
In column 2, line 12, replace "material" with --materials--; line 53, replace "nutrition" with --nutritional--; line 56, replace "foodgrade" with --food grade--.
In column 3, line 5, replace "before" with --being--.
In column 4, line 32, "example" should be followed by a comma; line 46, replace "e.g.," with --i.e.,--; line 65, replace "kaolin," with --kaolin and--.
In column 5, line 66, replace "dispersent" with --dispersant--.
In column 7, line 12, replace "dispersent" with --dispersant--; line 48, replace "four" with --flour--.
In column 9, line 35, after the Table entitled "Ingredients - Percent by Weight of Formula", add footnotes (b) and (c) as follows:

--[b]Formulas XC, XB and M150A each contain silicone DC 200 as a dispersant in the following amounts, expressed as percent by weight of the Formula; XC has 0.025 percent; XB has 0.001 percent and M150A has 0.025 percent.

[c]Formula M137E contains, in addition to the listed ingredients, 6.0 weight percent of 188 proof ethanol.--

In column 9, line 53, replace "eights" with --eighths--.
In column 10, TABLE I, replace the first occurrence of "M140H" with --M140G--.
In column 12, line 22, replace "composition" with --compositions--; line 48, replace "radially" with --radically--; line 53, omit the comma after "oil".
In column 13, line 46, between "while" and "room" insert --at--; line 63, replace "fired" with --fried--.
In column 15, lines 1-3, replace "Formulations in accordance with an embodiment of the present invention employing refractory blocking agents." with --Formulations In Accordance With An Embodiment Of The Present Invention Employing Refractory Blocking Agents.--; line 6, replace "an" with --and--; line 44, replace "includes" with --include--.

UNITED STATES PATENT AND TRADEMARK OFFICE
CERTIFICATE OF CORRECTION

PATENT NO. : 5,156,876

DATED : October 20, 1992

INVENTOR(S) : Clarence P. Clapp et al

It is certified that error appears in the above-identified patent and that said Letters Patent is hereby corrected as shown below:

In column 16, line 41, replace "of" with --or--; line 57, replace "propellent" with --propellant--; line 58, replace "n-butene" with --n-butane--.
In column 17, line 8, replace "propellent" with --propellant--.
In line 6 of claim 11, delete the comma after "sodium".

Signed and Sealed this

Twenty-seventh Day of September, 1994

Attest:

BRUCE LEHMAN

*Attesting Officer*   *Commissioner of Patents and Trademarks*